United States Patent
Meyer et al.

(10) Patent No.: US 6,414,492 B1
(45) Date of Patent: Jul. 2, 2002

(54) METHOD AND APPARATUS FOR PASSIVE DETECTION OF GEOPHYSICAL DISCONTINUITIES IN THE EARTH

(75) Inventors: David Gary Meyer, Longmont; Christian Fredrik Murer, Denver, both of CO (US)

(73) Assignee: Amalgamated Explorations, Inc., Denver, CO (US)

( * ) Notice: Subject to any disclaimer, the term of this patent is extended or adjusted under 35 U.S.C. 154(b) by 0 days.

(21) Appl. No.: 09/705,037

(22) Filed: Nov. 2, 2000

(51) Int. Cl.[7] .............. G01V 3/08; G01V 3/12
(52) U.S. Cl. ...................... 324/344; 324/348
(58) Field of Search .................. 324/344, 334, 324/335, 337, 345, 348, 349, 350, 324, 330, 331, 357

(56) References Cited

U.S. PATENT DOCUMENTS

| | | | |
|---|---|---|---|
| 2,246,542 A | 6/1941 | Smith ................ 175/4.51 |
| 2,608,602 A | 8/1952 | Muffly ............... 324/329 |
| 2,623,923 A | 12/1952 | Zimmerman ............ 324/333 |
| 3,087,111 A | 4/1963 | Lehan ................ 324/344 |
| 3,136,943 A | 6/1964 | Slichter .............. 324/344 |
| 3,197,704 A | 7/1965 | Simon et al. .......... 324/76.13 |
| 3,361,957 A | 1/1968 | Hings ................. 324/349 |
| 3,510,766 A | 5/1970 | Russell et al. ........ 324/72.5 |
| 3,662,260 A | 5/1972 | Thomas et al. ......... 324/72 |
| 3,679,978 A | 7/1972 | Hopkins, Jr. .......... 325/187 |
| 3,700,933 A | 10/1972 | Harkenrider et al. .... 307/310 |
| 3,942,101 A | 3/1976 | Sayer et al. .......... 324/344 |
| 3,986,207 A | 10/1976 | Gerbel et al. ......... 360/6 |
| 4,198,596 A | 4/1980 | Waeselynck et al. .... 324/344 |
| 4,409,551 A | 10/1983 | Norton ................ 324/349 |
| 4,434,508 A | 2/1984 | Sommer ................ 455/306 |
| 4,507,611 A | 3/1985 | Helms ................. 324/323 |
| 4,584,530 A | 4/1986 | Nicholson ............. 324/425 |
| 4,658,215 A | 4/1987 | Vinegar et al. ........ 324/366 |
| 4,675,606 A | * 6/1987 | Ganguly ............... 324/244 |
| 4,686,475 A | 8/1987 | Kober et al. .......... 324/349 |
| 4,724,390 A | 2/1988 | Rauscher et al. ....... 324/344 |
| 4,825,165 A | 4/1989 | Helms et al. .......... 324/323 |
| 4,841,250 A | 6/1989 | Jackson ............... 324/349 |
| 4,945,310 A | 7/1990 | Jackson ............... 324/349 |
| 5,148,110 A | * 9/1992 | Helms ................. 324/323 |
| 5,357,253 A | * 10/1994 | Van Etten et al. ...... 324/22 |
| 5,525,907 A | * 6/1996 | Frazier ............... 324/334 |
| 5,777,478 A | 7/1998 | Jackson ............... 324/248 |

\* cited by examiner

*Primary Examiner*—Edward Lefkowitz
*Assistant Examiner*—Reena Aurora
(74) *Attorney, Agent, or Firm*—Rader, Fishman & Grauer PLLC; Lee G. Meyer

(57) ABSTRACT

An apparatus and method for passively determining physical characteristics of subterranean geological formation which for example bear oil or gas or commercial important ore deposits such as precious metals. The apparatus includes an antenna for acquiring low frequency signals naturally emanating from the earth. The received signal is first put through a low pass filter and buffer and then converted from analog to digital, stored in a memory buffer, converted to a frequency spectrum by a Fourier transform, and then further processed to display geophysical information versus the depth of such discontinuities.

8 Claims, 2 Drawing Sheets

METHOD AND APPARATUS FOR PASSIVE DETECTION OF GEOPHYSICAL DISCONTINUITIES IN THE EARTH

FIELD OF THE INVENTION

The present invention relates to passive geophysical exploration and more particularly to determination of subsurface discontinuities associated with variance in low frequency electromagnetic fields emitted from, or reflected by, the earth.

BACKGROUND OF THE INVENTION

It has long been known that there are substantial electromagnetic fields associated with the earth. The origin of these electromagnetic fields is unclear: one theory holds that low-frequency electromagnetic fields are emitted from beneath the surface of the earth and radiate outward such that they can be measured by low frequency method at the surface. Others postulate that currents are generated by oxidation-reduction reactions taking place where water and hydrocarbons are present, and that the electromagnetic radiation is caused by interaction of these steady and unsteady currents with the earth's magnetic field. Still others postulate that the radiation is reflected from outside the earth's atmosphere.

According to well-documented scientific theory, however, discontinuities in the subterranean structure of the earth crust cause reflection of electromagnetic radiation at interfaces between electrically different materials. Additionally, the distance a transverse electromagnetic wave travels in a material before being substantially absorbed, is a known function or the frequency of the wave (so-called "skin-depth" expressions). Thus it has been hypothesized that prospecting for hydrocarbons such as oil, gas and coal, as well as precious metals, could be achieved by mapping the strength of electromagnetic waves at various frequencies which emanate from the earth providing a passive method of subterranean exploration and prospecting techniques.

It is well known that there are many active methods for determining geologic subterranean surfaces. It is standard in the oil and gas industry to set off pre-programmed charges, sending a mechanical wave through the area to be mapped, and then receiving these waves with sensitive seismic meters to locate and identify subterranean geologic formations. This methodology employs the concept that discontinuities in subterranean structure reflect mechanical waves, and that different wave frequencies propagate differently in the earth, similar to the behavior of electromagnetic waves described earlier. Grounded in scientific theories of mechanical wave propagation, a skilled artisan can process the received mechanical wave patterns, into a "readable" form and then use that information to determine with some precision the location of specific geologic structures which have been shown empirically to relate to hydrocarbons such as oil, gas, coal or other materials. Thus, these deposits can be pinpointed with some accuracy such that exploration drilling and the like can be optimized.

Many different methods for picking up and determining low frequency electromagnetic waves emanating from the earth have been proposed. By utilizing an antenna to pick up these naturally occurring frequencies emanating from the earth surface one can typically filter, amplify, modify and otherwise process these signals to turn them into a readable form.

Several prior art methods of detecting hydrocarbons from the earth's radiated low frequency signals have been proposed. Typically the received signal is amplified, filtered and detected using analog techniques. U.S. Pat. No. 5,148,110 issued to Helms detects a time varying signal emanated from the earth's surface. U.S. Pat. No. 4,686,475 to Cober et al. detects the vertical electric field components of telluric currents using a special antenna and a tuneable filter, with field detection performed in an audio manner using a simple listening device. As the frequencies monitored moves across a range of frequencies, the pitch heard by the operator varies. This method, however, is extremely subjective and suffers from unreliability and inconsistency.

It well known that there is an extremely low signal-to-noise ratio associated with these low frequency signals, and this high level of noise typically causes interference in detecting those signals that are determinative of geologic formations. Various low pass and high pass filtering techniques have been used or employed after initial amplification of the signal. This amplification and filtering is know as conditioning and pre-conditioning of the signal and is generally considered to be the most common technique for identifying electromagnetic signals emanating from the earth.

One of the challenges in the prior art, then, has been to find a proper way of conditioning the received signal so that the "true" information can be determined in a consistently reliable and repeatable manner. One problem commonly experienced in the prior art is that simple application is not typically sufficient to allow filters to operate effectively. U.S. Pat. No. 3,087,111 issued to Lehan at al describes a system whereby signals are amplified and then added to the oscillator frequency. Additionally, the background scientific basis for the method in U.S. Pat. No. 3,087,111 assumes that the skin-depth relation for the earth is $$\delta = \sqrt{\frac{2}{\mu \sigma \omega}},$$

(in MKS Units) an approximation that is valid only if the earth is a very, very good conductor (i.e. the conductivity $\sigma$ is large). However, it is well accepted that the earth is not a good conductor.

U.S. Pat. Nos. 3,1797,704 to Simon, et al. and 4,198,596 to Waeselynck, et al. describes a system that adds an oscillator frequency to the detected signal and then low pass filters. For the most part the oscillator controls the center pass frequency of the filter being used. Similarly, U.S. Pat. No. 6,087,833 issued to Jackson describes a geophysical prospecting technique that uses a tuned signal to sweep a variety of sensed frequencies.

The major problem in any of these prior art techniques is analyzing the data. Because of the low frequency and energy level of these signals, separating this data from background noise is particularly difficult. Each of these prior art devices and techniques is susceptible to noise problems emanating from spurious signals from external noise sources such as distant lightning strikes, airplanes passing overhead, cellular and wireless phones, and the like. Moreover, each of these devices and techniques make use of analog signal processing techniques such as modulation/demodulation. These analog techniques are typically clumsy and require relatively high-energy electromechanical devices such as strip-chart recorders. These electromechanical devices are typically bulky and consume battery power quickly, thus making them unsuitable for use in the field for prolonged periods of time. It is therefore desirable to create a geophysical exploration device that overcomes the various shortcomings of the prior art.

SUMMARY OF THE INVENTION

In accordance with various aspects of the present invention there has now been discovered a method and apparatus for analyzing electromagnetic radiation which emanates from the earth by use of analog to digital conversion and matched anti-aliasing filtering so as to compile data which is stored in a buffer and then Fourier transformed to render a readable signal such as on a display. Various embodiments of the invention account for a signal with a spectrum between about 0 Hz and 5 kHz that can be produced without using a modulator or demodulator or a comparator. In accordance with the invention electromagnetic waves emanating from the earth are received by an antenna digitally sampled and stored. A Discrete Fourier transform (such as a fast Fourier transform (FFT)) converts time domain information into frequency domain information for display and further analysis.

In accordance with the broad aspect of the invention, low frequency electromagnetic energy emanating from the earth is received, filtered, digitized, and transformed into a readable signal. The device of the instant invention employs an antenna to receive an electromagnetic signal which is passed through a low pass filter and buffer to a tuned analog to digital (A/D) converter, which allows the received signal information to be transformed or otherwise processed digitally the converted digitized signal may be stored in a buffer such as a hard drive, and may be displayed on any display means such as a CRT, flat panel display, printer or the like.

In accordance with the method of the instant invention, electromagnetic radiation is received from the earth, is filtered to remove high-frequency components, converted to a digital equivalent, and processed to produce an analyzable output.

BRIEF DESCRIPTION OF THE DRAWINGS

The features and advantages of the present invention are hereinafter described in the following detailed description of illustrative embodiments to be read in conjunction with the accompanying drawing figures, wherein like reference numerals are used to identify the same or similar parts in the similar views, and.

DETAILED DESCRIPTION OF EXEMPLARY EMBODIMENTS

The present invention may be described herein in terms of functional block components and various processing steps. It should be appreciated that such functional blocks may be realized by any number of hardware and/or software components configured to perform the specified functions. For example, the present invention may employ various integrated circuit or optical components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, MATLAB, MATHCAD, assembler, or the like, with the various algorithms being implemented with any combination of data structures, objects, processes, routines or other programming elements. Further, it should be noted that the present invention could employ any number of conventional techniques for electronics configuration, signal processing, data processing and the like.

It should be appreciated that the particular implementations shown and described herein are examples of the invention and are not intended to otherwise limit the scope of the present invention in any way. Indeed, for the sake of brevity, conventional electronics, optics, software development and other functional aspects of the systems (and components of the individual operating components of the systems) may not be described in detail herein. Furthermore, the connecting lines shown in the various figures contained herein are intended to represent exemplary functional relationships and/or physical or logical couplings between the various elements. It should be noted that many alternative or additional functional relationships, physical connections or logical connections may be present in a practical geophysical sensing device. Moreover, no item or component is essential to the practice of the invention unless the element is specifically described herein as "essential" or "critical".

Overview

Figure 1:
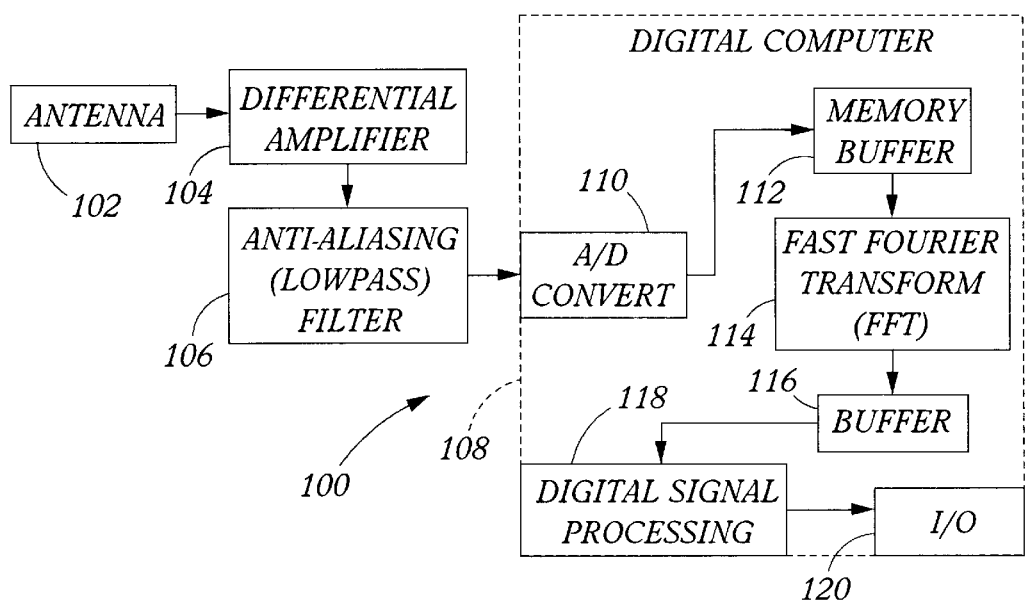
FIG. 1 is a block diagram of an exemplary geophysical exploration device.

A block diagram of an exemplary system 100 for geophysical exploration/prospecting is shown in FIG. 1. With reference now to FIG. 1, antenna 102 picks up electromagnetic waves or radiation generated by currents in the earth's crust as well as electromagnetic waves from other sources including noise, radio transmissions, etc. This signal is sent to a differential amplifier 104 which suitably rejects common-mode noise or bias, and converts the non-referenced antenna signal into a ground-referenced signal with low output impedance, This ground reference signal is then low-pass filtered at filter 106, sampled by the A/D converter 110 of a digital computer 108 at a suitable sampling frequency, and stored in the RAM memory of computer 108, as appropriate.

When a user-supplied number of samples have accumulated, a Fast Fourier Transform (FFT) may be applied to the data to yield a spectrum of the incoming signal up to a folding frequency (which may be ½ the sampling frequency). Any spectrum above the folding frequency will be aliased into the folding frequency. If low-pass filter 106, and sampler 110, are well matched, however, there is no appreciable spectrum above the folding frequency in the incoming signal. Therefore, matching the A/D rate and the low-pass filter is important in obtaining the best results.

The results of the Fourier transforms are saved to a disk, memory or other suitable buffer 116. After a user-determined number of FFT data sets are accumulated on disk, further digital signal and statistical processing 118 may be performed to, e.g., average out spurious (non-repeating) "noise" and/or to detect and emphasize frequencies where particularly strong signals repeatedly occurred. The results are then displayed on the screen of computer 108. The display on the screen may also be sent to a printer attached to the computer, or otherwise processed as appropriate.

Principle of Operation

A fundamental idea in electromagnetic field is that electromagnetic waves only penetrate to relatively shallow depths inside materials that are reasonable conductors. More rigorously, if the complex dielectric constant of a (linear) medium is separated, as is customary, into a real dielectric part, $\in$, and a real "conductivity" part, $\sigma$, then a transverse wave at frequency $\omega$ propagating as $\exp(ik\cdot x - i\omega t)$ generally has a wave vector given by $$k = n\left[\beta + i\frac{\alpha}{2}\right]$$

where n is a unit vector in the direction of propagation, and manipulation of Maxwell's equations shows $$\beta = \sqrt{\mu\varepsilon}\frac{\omega}{c}\left[\frac{\sqrt{1 + \left(\frac{4\pi\sigma}{\omega\varepsilon}\right)^2} + 1}{2}\right]^{1/2} \quad (1.1)$$

$$\alpha = 2\sqrt{\mu\varepsilon}\frac{\omega}{c}\left[\frac{\sqrt{1 + \left(\frac{4\pi\sigma}{\omega\varepsilon}\right)^2} - 1}{2}\right]^{1/2}$$

The electromagnetic skin depth, $\delta$, is defined as the penetration distance (in the propagation direction, n) into the medium, where the strength of the fields has fallen off by a factor of $e^{-1} \approx 0.369$. The expression for $\delta$ is given by $$\delta = \frac{2}{\alpha} = \frac{c}{\omega\sqrt{\mu\varepsilon}}\left[\frac{2}{\sqrt{1 + \left(\frac{4\pi\sigma}{\omega\varepsilon}\right)^2} - 1}\right]^{1/2} \quad (1.2)$$

In the limit of a very good conductor or, mathematically, where $$\frac{4\pi\sigma}{\omega\varepsilon} \gg 1$$

the approximation $$\sqrt{1 + \left(\frac{4\pi\sigma}{\omega\varepsilon}\right)^2} - 1 \approx \frac{4\pi\sigma}{\omega\varepsilon},$$

may be made in the denominator of (1.2). This gives $$\delta = \frac{c}{\omega\sqrt{\mu\varepsilon}}\left[\frac{\omega\varepsilon}{2\pi\sigma}\right]^{1/2} = \frac{c}{\sqrt{2\pi\omega\mu\sigma}} \quad (1.3)$$

which is the "classic" expression for electromagnetic (skin depth). The salient characteristic is that the skin depth, as given by (1.3) decreases with increasing frequency, $\omega$. Soils are typically relatively poor conductors with conductivity ranging (in MKS units) from $10^{-1}$ to $10^{-3}$ mho/meter (compared to copper, for example, which has a conductivity on the order of $10^8$ mho/meter). It has been postulated that below the surface of the earth where hydrocarbons and ground water are present, conductivity is much higher than at the surface. In any case, even if the "full" expression 1.2 is evaluated for skin depth, it can be shown that skin depth is predicted to decrease with increasing frequency.

The discussion above is a theoretical justification for the principle that for electromagnetic waves generated within the earth, the higher the frequency, the shorter the distance before they are totally re-absorbed again by the earth. Thus, when "listening" at earth's surface for electromagnetic waves generated within the earth, lower frequencies generally correspond to sources at greater depths.

The exact relationship between depth and frequency will most likely vary from location to location on the earth (varying with, among other things, the local conductivity of the geological stratum beneath the observation point). Nevertheless, it may be postulated that the general rule above still holds. Assuming the magnetic permeability, $\mu$ is nearly unity (a good assumption unless strongly paramagnetic substances, like iron or copper ore are present) and rearranging (1.2) gives $$\varepsilon = \frac{4\delta^2\pi^2\sigma^2}{c^2} - \frac{c^2}{\delta^2\omega^2} \quad (1.4)$$

For relatively small skin depth, conductivity will be typical of soils rather than of deep hydrocarbons and water. So, setting a $\sigma = 10^{-1}$ mho/meter $\approx 9 \times 10^8$ sec$^{-1}$ for Gaussain units, and using $c^2 = 9 \times 10^{20}$ cm$^2$/sec$^2$, and evaluating (1.4) at $\omega = 7\pi \times 10^3$ radians/sec leads to:

$$\varepsilon = \frac{9\delta^2\pi^2}{2500} - \frac{9 \times 10^{14}}{48\delta^2\pi^2} \quad (1.5)$$

This expression can be rearranged to find the square of the skin depth:

$$\delta^2 = \frac{1250\sqrt{49\varepsilon^2 + 1296 \times 10^{10}} + 8750\varepsilon}{63\pi^2} \quad (1.6)$$

Notice from (1.5) that the permittivity value for the soil is negative for small values of skin depth, crosses zero as the presumed skin depth increases, and then begins to increase with increasing presumed skin depth. From (1.6) it can be shown that the smallest physically plausible value of $\epsilon$ (zero) corresponds to a skin-depth of $$\delta = \sqrt{\frac{5}{7\pi^2}} \times 10^4 \approx 2690$$

or, in other words, about 27 meters, which is a plausible value. The permittivity of soil is not zero, however, and in fact poor conducting soils will be a reasonable dielectric. Unless ferroelectric materials in the frequency ranges of interest are present in the soil, however, both the atoms and the electrons respond to some extent to applied fields and an upper bound for the permittivity of the soil may be about $10^5$.

Figure 2:
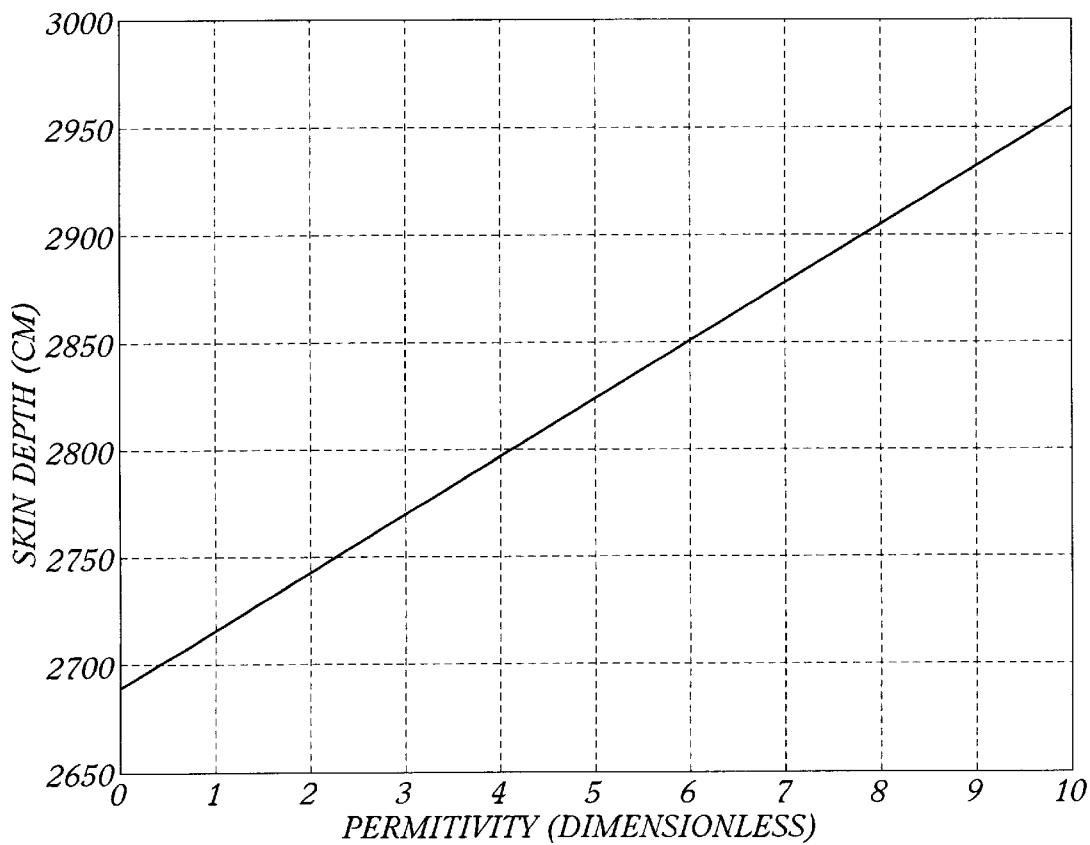
FIG. 2 is a plot of skin depth versus dielectric for exemplary soils.

It will be noticed that in the range 0 to $10^5$, only in the very latter part of that range does the first term under the radical in (1.5) become comparable to the second term. Thus, if the graph of (1.6) is plotted using, e.g., MATLAB a nearly linear relationship is expected. In fact, an exemplary graph is shown in FIG. 2. As shown in FIG. 2, the skin depth is, for all dielectric values, no more than 30 meters. This is very reasonable and certainly does not contradict, in any way, the experimental findings that the soil surface appears in the output(s) of the device in this case at around 3 KHz to 3.5 KHz.

Geophysical Exploration Device

With momentary reference again to FIG. 1, an exemplary geophysical exploration device 100 suitably includes an antenna 102, a differential amplifier 104, a filter 106, and a digital computer 108. Digital computer 108 suitably includes an analog-to-digital (A/D) converter 110, a memory buffer 112, a processor 114 for converting time domain data to frequency domain data, a hard drive or other storage buffer 116, digital signal processing 118 (which may coincide with processor 114 in various embodiments), and one or more input/output devices 120 such as a keyboard, mouse, CRT or flat panel display, printer, modem, network interface and/or the like. Each of these components is described in more detail below. Antenna 102 may be any sort of antenna suitable for receiving low-frequency electromagnetic signals radiated from the earth. In an exemplary embodiment, antenna 102 is a helical antenna wherein its physical dimensions may be small compared to the wavelengths of the electromagnetic signals of interest since the wavelength(s) of relatively low-frequency signals (e.g. less than about 500 KHz, which is at or above the highest signal which could be digitally captured using today's A/D technology) is in the range of several meters to tens of kilometers. In such embodiments wherein antenna 102 is, the efficiency of the antenna may be correspondingly low. Typical peak-to-peak voltage ranges coming from the antenna signal may be, for example, in the range of 5 mV to 12 mV, although of course other voltages may be produced by antennas in various alternate embodiments.

Buffering/Filtering System

Many analog signals with different frequencies produce identical spectra when digitally sampled at a given frequency. This phenomena (commonly referred to as "aliasing") is undesirable, because it can lead to errors or inaccuracies in the detection of desired signals. To avoid aliasing, a low-pass filter may be employed to reduce the effects of high-frequency signals. This is commonly referred to as anti-alias filtering. To avoid voltage division effects and also to gain immunity from common-mode noise and any common-mode bias in the signal from the antenna, a differential amplifier 104 and/or an electrical buffer may be used in various embodiments.

Differential amplifier 104 and first stage 300 of lowpass filter 106 may be implemented in any number of ways, for example on any signal conditioning module such as a model SCC-FT01 Feedthrough/Prototype signal conditioning module available from the National Instruments Inc, which may be mounted inside a model SCC-2345 carrier (available from the National Instruments Inc, corporation) or other carrier. This module may be positioned as the first stage of a dual-stage conditioning set and may be plugged into socket J11 in the carrier, as appropriate. Of course any type of filter scheme could be used in an alternate embodiment, including any integrated circuit or discrete component-based filter.

Figure 3A:
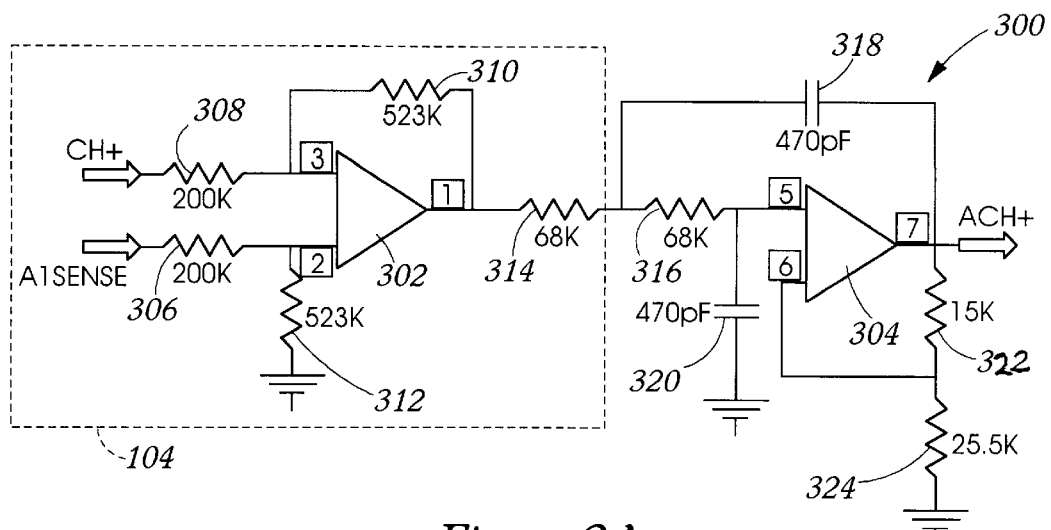
FIG. 3A is a circuit diagram of an exemplary first stage containing a differential amplifier and a $2^{nd}$ order low pass filter.
Figure 3B:
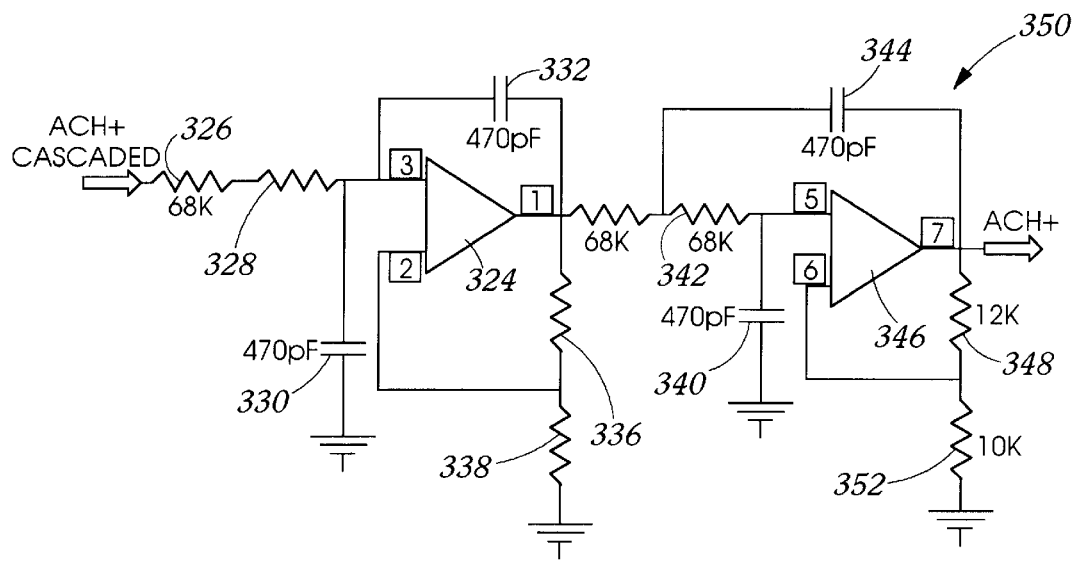
FIG. 3B is a circuit diagram of an exemplary second stage, containing a $4^{th}$ order low pass filter.

The schematic of exemplary circuitry for an exemplary buffering amplifier 104 and low-pass anti-aliasing filter 106 is shown below in FIGS. 3A and 3B. With reference now to FIG. 3A, the first stage 300 of an exemplary amplifier 104 and anti-aliasing filter 106 suitably includes two amplifiers 302 and 304 coupled together with a network of bias resistors. The LF442 dual lowpower FET op-amp chip from National Semiconductor is one example of a component that may be used for both op-amps 302 and 304 shown in FIG. 3A. The pin-outs shown in the diagram correspond to this chip, although of course other chips or even a discrete amplifier could be used in alternate embodiments. The first part of the circuitry (including op amp 302) forms a differential amplifier with a gain of approximately 523/200= 2.615. This section converts the non-referenced antenna source into a ground-referenced signal and amplifies it slightly. The input impedance of this differential configuration may be about 400K. The output impedance may be on the order of a few ohms up to the bandwidth of the LF442 chip.

The second part of circuitry 300 (surrounding amplifier 304) suitably forms a $2^{nd}$ order Butterworth lowpass filter with the 3 dB point at approximately 5 Khz, as appropriate for the particular embodiment. This design is a standard so-called "voltage-controlled/ voltage-source (VCVS)" design. The 3 dB point, $f_c$, may be programmed by the product of the resistance and capacitance. Thus:

$$f_c = \frac{1}{2\pi RC}$$

Wherein R=68K and C=470 pF (as in the example shown in FIG. 3A), this yields:

$$f_c = \frac{1}{2\pi(68)(470)10^{-9}} = 4979.81 \approx 5 \text{ KHz}$$

Op-amp 304 may be configured as a non-inverting amplifier, with a gain set by the ratio of the two resistors 316 and 322. In the embodiment shown in FIG. 3A, this gain is equal to $$1 + \frac{15\,K}{25.5\,K} = 1.58.$$

In accordance with the well-known Nyquist Sampling Theorem, the cutoff frequency, $f_c$, of a lowpass filter is not higher than one half (½) the A/D sampling frequency in Hertz (i.e. how many samples are taken in 1 second). A conventional $2^{nd}$ order filter has a roll-off of 40 dB per decade; a $3^{rd}$ order filter has a roll-off 60 dB per decade; a $6^{th}$ order filter has a roll-off of 120 dB per decade, and etc. The higher the filter order, the steeper the roll-off line and the more closely a real lowpass filter approximates an ideal lowpass filter. Of course, constraints on complexity, cost, space, and/or power limit the order of lowpass filter that can be used in any particular embodiment.

The exemplary first-stage, low-pass, anti-aliasing filter 300 shown in FIG. 3A suitably contains a $2^{nd}$ order lowpass filter that provides a roll-off of 40 dB per decade. With only this lowpass filter operating, a sinusoid at a frequency of 50 KHz (a decade above the 5 KHz cut-off) may be attenuated by 40 dB or, in other words, by ¹⁄₁₀₀. A sinusoid at 10 KHz, however, would be attenuated by only a factor of approximately ⅓. To improve this performance, and lower the requirements on the A/D sampling frequency, a second stage low-pass filter 350 may be employed. An exemplary second-stage low-pass filter 350 is shown in FIG. 3B. This second stage may be, for example, a $4^{th}$ order Butterworth design.

With the second stage in place, the total order of the lowpass filtering done by the system is six. Thus, the roll-off may be modeled as a relatively steep 120 dB per decade. A 50 KHz signal would be attenuated by a factor of ¹⁄₁,₀₀₀,₀₀₀, and a signal at 10 KHz is attenuated by approximately ¹⁄₁₀₀₀. In the embodiment shown in the FIGS., 3A and 3B, signals between 0 and about 4.5 KHz would be passed through the filter 106 as shown in FIG. 1 relatively unaffected. Again, the filtering scheme described in FIGS. 3A and 3B is one example of a filter that is provided for purposes of illustration; many different types of filters (including any off-the-shelf or custom-made filter, as well as any hardware or software conversion or filtering process) could be used in the various embodiments of the invention.

Analog-Digital Conversion

To further limit the effects of aliasing, the sampling frequency may be selected to be about two times the highest frequency contained in the signal being digitized according to the well-known Nyquist Sampling Theorem. A/D converters that are capable of sampling at a relatively high frequency (often referred to as "fast" converters) are typically more expensive than "slow" A/D converters. The cost of an A/D converter typically rises quickly with its speed. In addition, fundamental limitations in cost, complexity, and physics limit the highest sampling frequency available with any A/D converter. A relatively fast A/D converter, for example, can sample at nearly 5 MHz (i.e. five million times a second) but is typically relatively expensive. Most naturally-occurring signals contain frequencies past the range of interest, and usually at more than ½ the sampling frequency of any cost-effective A/D converter that would be employed. Because of this, as discussed previously, a naturally-occurring signal (such as the electromagnetic signal radiating from the earth) may be low-pass filtered before the A/D conversion takes place.

As shown in FIG. 1, analog-to-digital converter 110 is any hardware and/or software apparatus capable of converting analog signals to digital equivalents. To optimize the design of apparatus 100, the cut-off frequency and the order of the low-pass filter 106, and the sampling frequency of A/D converter 110 may be "matched" so that the low-pass filter "sufficiently" attenuates signals that are at one half the sampling frequency or above.

In an exemplary embodiment, a model 6012E-DAQCard-AI-16XE-50 multifunction A/D card available from National Instruments may be used to perform analog to digital conversion. This device is typically provided with associated driver software (called "NI-DAQ") to accommodate placement in a PCMCIA slot of computer 108. Of course, other A/D circuitry or devices may be used in alternate embodiments. The details of interfacing with and gathering data from an A/D card may be handled by the MATLAB Data Acquisition Toolbox ("MDAT"), or through any other technique. The MDAT is a so-called "Toolbox" of the more general-purpose MATLAB program. The MDAT version 1.0 reference manuals, hereby incorporated herein by reference, describe one technique for configuring and gathering data with a A/D conversion card. The 6012E-DAQCard-AI-16XE-50 and the NI-DAQ driver, for example, are a supported card/driver combination for the MDAT.

A/D converter 110 is suitably connected to filter 106 through any technique. The 6012E-DAQCard-AI-16XE-50 may be connected to the input of the National Instruments SCC-2345 carrier by a cable adapter and a National Instruments SCC series standard 68 pin cable, for example.

Digital Computer

Computer 108 is any digital computer such as any workstation, personal computer, portable computer, personal digital assistant, or other processing device. In an exemplary embodiment, computer 108 is a personal computer such as a Dell Latitude CPx Laptop with a 500 MHz Pentium III processor, 96 Mb of RAM memory, a 6 Gb hard disk drive, and 2 PCMCIA type II sockets, although of course any other brand, model or type of computer could be used in alternate embodiments. The computer typically includes an operating system such as the Windows NT 4.0 operating system available from the Microsoft Corporation of Redmond, Washington, or any other another version of the Windows, MacOS, NeXT, BeOS, UNIX, LINUX or any other operating system. In various embodiments, the power management features of the computer may be disabled and the screen brightness be set at a higher than "factory" setting when running on battery power. This is to prevent power management features (such a processor slow-down, etc.) from interfering with a data acquisition run; the system may be configured to be a "set and forget" type (e.g. the user types a single command, answers a few questions, and then leaves the computer alone while the data gathering is occurring). Data gathering may take, depending on certain parameters set by the user up to 20 minutes. The power management features would ordinarily try to power down the computer if no key were touched, or no mouse movement detected, for that long a period. The screen brightness setting is to facilitate reading the screen under field conditions, for example bright direct, or only partially occluded, sunlight. The digital signal processing (including FFT computation 114 and signal processing 118) may be done with MATLAB functionality including the ability to compute FFT's (Fast Fourier Transforms) and to plot/display results. Of course other hardware or software functionality may be used in other embodiments. For example, computations could be performed by TK Solver, MATHCAD, any spreadsheet program such as Excel, a custom program written in any programming language, or any other software. See Appendix A for exemplary MATLAB codes and scripts used for digital signal processing.

Operating Technique

Figure 4:
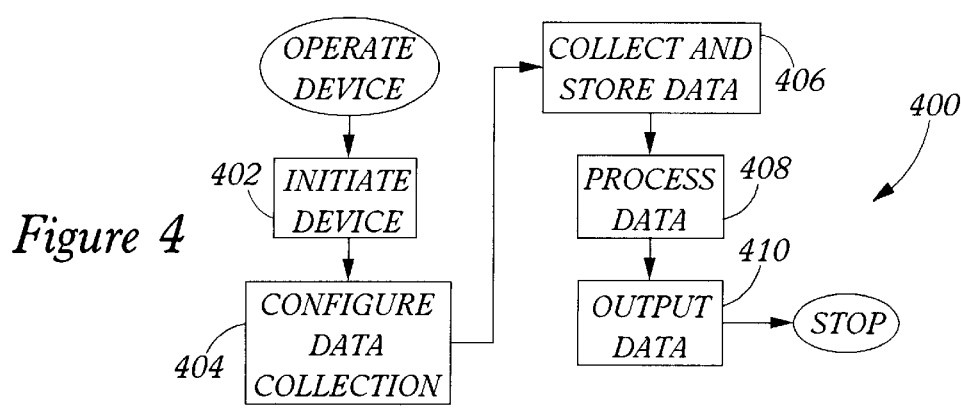
FIG. 4 is a flowchart of an exemplary process for operating the geophysical exploration device of the instant invention.

Having thus described an exemplary apparatus for geophysical exploration, we may now describe a technique for observing and recording geophysical data such as electromagnetic information radiated from the earth. FIG. 4 is a flowchart of an exemplary technique 400 for conducting geophysical exploration. With reference now to FIG. 4, an exploration technique 400 suitably includes initiating the exploration device (step 402), configuring data collection (step 404), collecting and storing data (step 406), processing data (step 408), and formatting/outputting data (step 410). The results of step 408 may be analyzed by a human reader or by an automated process to determine fluctuations in the earth's radiated electromagnetic waves that may correspond to sub-terranean precious metals, hydrocarbons, water, and the like.

The process of geophysical exploration suitably begins by configuring and initiating a geophysical exploration apparatus 100 (step 402). For the device 100 shown in FIG. 1, step 402 suitably includes placing device 100 in a suitable location, initializing computer 108, and assembling the various components so that they are capable of functioning. When the apparatus 100 is prepared, data collection may be configured as appropriate (step 404). Data collection may be in accordance with any technique and may include any number of data samples. In an exemplary embodiment, a user suitably selects a number of data "runs" to be performed, and the number of samples to be taken during each run. Each sample suitably corresponds to a reading of the electromagnetic radiation emanating from the earth at the particular location.

In an exemplary embodiment, a MATLAB script my be used to configure data collection, collect samples of data, and then process them. User input to the process may include a NAME which is used for identification and storage of the collected data, DURATION which suitably corresponds to the length of time the system will gather data, DATASETS which suitably describes how many separate acquisitions will be made. With choices for DURATION and DATASETS made, exploration device 100 may collect data for analysis (step 406). Collecting data suitably includes monitoring analog signals received from antenna 102, filtering the analog data in amplifier 104 and filter 106, converting filtered analog data to a digital equivalent with A/D converter 110, and storing the digital information in computer 108. In various embodiments, the digital data may be stored in memory 112 until a fast Fourier transform 114 may be performed, and then the transformed data may be stored on a hard drive, memory, or other mass storage device/buffer 116 on computer 108. Data collection may be controlled by a MATLAB script or another program executing on computer 108.

After data collection (step 406) is complete, data may be processed (step 408) as appropriate to place the data into a proper output format for analysis by a user or computerized process. Exemplary processing techniques may include data smoothing/interpolation in the frequency or time domain, averaging of data obtained over multiple "runs", statistical techniques (such as computing mean or standard deviation information for observations at various points of the frequency spectra), or the like. In an exemplary embodiment, data received from A/D converter 110 may be converted from time domain information to a frequency domain equivalent through the application of a Fourier transform (such as a fast Fourier transform (FFT)). This process may be performed by MATLAB or other software for processing mathematical data on computer 110. Frequency domain data suitably includes magnitudes of the various frequency components making up the time-domain signal monitored by antenna 102. These components may be mathematically excluded (e.g. for spurious signals at unwanted frequencies), averaged, or the like as appropriate.

Outputting the processed data (FIG. 4, step 410) suitably includes providing a graphical, textual or other output to the user (or another computerized process) for analysis of the electromagnetic fields observed by antenna 102. Of course various forms of frequency plots, time domain plots, and the like may be created to aid in this analysis.

The corresponding structures, materials, acts and equivalents of all elements in the claims below are intended to include any structure, material or acts for performing the functions in combination with other claimed elements as specifically claimed. Moreover, the step s recited in any method claims may be executed in any order. The scope of the invention should be determined by the appended claims and their legal equivalents, rather than by the examples given above.

What is claimed is:

1. A method of passively exploring the earth's crust, the method comprising the steps of:

receiving electromagnetic radiation from the earth to produce an analog signal as a function of said electromagnetic radiation;

filtering said analog signal to remove components having frequencies greater than a cut-off frequency, the cut-off frequency being chosen to prevent substantial aliasing;

converting said analog signal to a digital signal;

processing said digital signal to reduce non-repeating components and thereby to produce an analyzable output for determining areas of interest in the earth's crust.

2. The method of claim 1 wherein said processing step comprises performing a Fourier transform on said digital signal to create a frequency spectrum.

3. The method of claim 2 wherein said processing step further comprises formatting said frequency spectrum such that said output comprises a plot corresponding to discontinuities in subterranean structure versus depth in the earth's crust of such discontinuities.

4. The method of claim 1, further comprising filtering said analog signal to remove components having frequencies greater than about five kHz.

5. A device for passively exploring the earth's crust, the device comprising:

an antenna configured to receive electromagnetic radiation emanating from the earth to produce an analog signal as a function of said radiation;

a filter for removing components of said analog signal having frequencies greater than a cut-off frequency to produce a filtered signal, the cut-off frequency chosen to prevent substantial aliasing;

an analog-to-digital converter for producing a digital data stream as a function of said filtered signal; and a processor for processing said digital data stream to reduce non-repeating components and thereby to produce an analyzable output which corresponds to said radiation.

6. The device of claim 5 wherein said processor processes said digital data stream by use of a Fourier Transform to create a frequency spectrum.

7. The device of claim 6 wherein said processor formats said frequency spectrum such that said output comprises a plot corresponding to discontinuities in subterranean structure versus depth of such discontinuities.

8. The device of claim 5, wherein the filter is adapted to remove components of said analog signal having frequencies greater than about five kHz.

* * * * *